（12） United States Patent
Lim et al.

(10) Patent No.: US 10,181,927 B2
(45) Date of Patent: Jan. 15, 2019

(54) APPARATUS AND METHOD FOR CHANNEL QUALITY INFORMATION FEEDBACK IN WIRELESS COMMUNICATION SYSTEM USING FREQUENCY QUADRATURE AMPLITUDE MODULATION

(71) Applicant: Samsung Electronics Co., Ltd., Gyeonggi-do (KR)

(72) Inventors: Chi-Woo Lim, Gyeonggi-do (KR); Min Sagong, Gyeonggi-do (KR); Sung-Nam Hong, Gyeonggi-do (KR); Hyun-Kyu Yu, Gyeonggi-do (KR); Kyung-Whoon Cheun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 14/618,956

(22) Filed: Feb. 10, 2015

(65) Prior Publication Data

US 2015/0230118 A1    Aug. 13, 2015

(30) Foreign Application Priority Data

Feb. 10, 2014    (KR) .................. 10-2014-0015108

(51) Int. Cl.
| | |
|---|---|
| *H04L 1/20* | (2006.01) |
| *H04W 24/10* | (2009.01) |
| *H04L 1/00* | (2006.01) |
| *H04L 27/10* | (2006.01) |
| *H04L 27/34* | (2006.01) |
| *H04W 88/08* | (2009.01) |

(52) U.S. Cl.
CPC .......... *H04L 1/0003* (2013.01); *H04L 1/0026* (2013.01); *H04L 27/10* (2013.01); *H04L 27/34* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 8,300,716 | B1 * | 10/2012 | Lee ....................... | H04L 1/0003 370/241 |
| 2004/0131125 | A1 * | 7/2004 | Sanderford, Jr. ......... | H04L 5/06 375/261 |
| 2005/0282500 | A1 * | 12/2005 | Wang ...................... | H04L 1/206 455/67.13 |
| 2012/0099446 | A1 * | 4/2012 | Su ......................... | H04L 1/0003 370/252 |
| 2012/0155415 | A1 * | 6/2012 | Seok ..................... | H04L 1/0003 370/329 |

(Continued)

FOREIGN PATENT DOCUMENTS

| | | |
|---|---|---|
| KR | 10-2014-0081301 | 7/2014 |
| KR | 10-2014-0081751 | 7/2014 |
| KR | 10-2014-0081753 | 7/2014 |

*Primary Examiner* — Kevin C. Harper
*Assistant Examiner* — Derrick V Rose

(57) ABSTRACT

A method of operating a base station in a wireless communication system supporting frequency and quadrature-amplitude modulation (FQAM) is provided. The method includes receiving channel quality information and non-Gaussian information for a data region from a mobile station, and determining a MCS level on the basis of the channel quality information and the non-Gaussian information.

16 Claims, 9 Drawing Sheets

(56) References Cited

U.S. PATENT DOCUMENTS

2014/0056243 A1* 2/2014 Pelletier ............... H04W 74/04
                                                        370/329
2014/0177687 A1   6/2014 Seol et al.
2014/0177756 A1   6/2014 Park et al.

* cited by examiner

APPARATUS AND METHOD FOR CHANNEL QUALITY INFORMATION FEEDBACK IN WIRELESS COMMUNICATION SYSTEM USING FREQUENCY QUADRATURE AMPLITUDE MODULATION

PRIORITY

The present application is related to and claims the benefit under 35 U.S.C. § 119(a) of a Korean patent application filed in the Korean Intellectual Property Office on Feb. 10, 2014 and assigned Serial No. 10-2014-0015108, the entire disclosure of which is hereby incorporated by reference.

TECHNICAL FIELD

The present disclosure relates to a channel quality information feedback in a wireless communication system using Frequency and Quadrature-Amplitude Modulation (FQAM).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, a signal processing procedure for wireless communication includes channel coding, modulation, frequency up-conversion, and transmission in a transmitting side. In accordance therewith, signal processing in a receiving side includes frequency down-conversion, demodulation, and channel decoding. Herein, the demodulation in the receiving side includes a procedure of calculating a per-bit or per-symbol decoding metric.

To generate the decoding metric, it is necessary to premise a specific probability distribution for an interference and noise signal. The conventional technique assumes a Gaussian distribution for an interference signal to perform decoding with a low complexity. Therefore, a quadrature amplitude modulation (QAM)-series modulation scheme is primarily used in order for the interference signal to be similar to a Gaussian signal to the maximum extent possible.

However, it is generally known that a channel which assumes a non-Gaussian distribution has a greater channel capacity than a channel which assumes the Gaussian distribution. Therefore, if decoding is performed properly, the channel which assumes the non-Gaussian distribution can have a higher decoding performance in comparison with the channel which has the Gaussian distribution.

Accordingly, there is a need to develop a modulation scheme which allows an interference signal to be similar to the non-Gaussian distribution to the maximum extent possible, and as a result, a frequency-QAM (FQAM) scheme is proposed. The FQAM method is a hybrid modulation scheme in which the QAM scheme is combined with a frequency shift keying (FSK) scheme, and has advantages of the QAM scheme having a high spectral efficiency and the FSK scheme allowing an interference signal to have a non-Gaussian distribution.

However, since the FQAM is a new technique proposed recently, a channel quality information feedback scheme different from the conventional scheme is required. A method has been conventionally used in which a signal to interference plus noise ratio (SINR) value is calculated on the basis of channel estimation using a pilot, the calculated SINR value is transmitted by quantizing it through a determined scheme, a modulation and coding scheme (MCS) level is determined on the basis of the calculated SINR value, and an MCS index corresponding to the determined MCS level is transmitted. That is, in a channel quality information feedback of a wireless communication system using the conventional QAM scheme, channel information other than the SINR value has not been used to determine the MCS level.

Since a non-Gaussian distribution for an interference signal is assumed in the wireless communication system using the FQAM scheme, it is difficult to determine an accurate MCS level when only the SINR is simply used, which causes a performance deterioration.

SUMMARY

To address the above-discussed deficiencies, it is a primary object to provide a method and apparatus for a channel quality information feedback in a wireless communication system using a frequency-QAM (FQAM) scheme.

Another exemplary embodiment of the present disclosure provides a method and apparatus for measuring non-Gaussian information of a channel in a wireless communication system using an FQAM scheme.

Another exemplary embodiment of the present disclosure provides a method and apparatus for defining a modulation and coding scheme (MCS) level considering non-Gaussian information of a channel and for feeding back the MCS level in a wireless communication system using an FQAM scheme.

According to an exemplary embodiment of the present disclosure, a method of operating a base station in a wireless communication system supporting FQAM is provided. The method includes receiving channel quality information and non-Gaussian information for a data region from a mobile station, and determining a MCS level on the basis of the channel quality information and the non-Gaussian information.

According to an exemplary embodiment of the present disclosure, a method of operating a mobile station in a wireless communication system supporting FQAM is provided. The method includes measuring channel quality information, measuring non-Gaussian information for a data region, and transmitting the channel quality information and the non-Gaussian information to a base station.

According to an exemplary embodiment of the present disclosure, a base station apparatus in a wireless communication system supporting FQAM is provided. The apparatus includes a transceiver for receiving channel quality information and non-Gaussian information for a data region from a mobile station, and a processor for determining a MCS level on the basis of the channel quality information and the non-Gaussian information.

According to an exemplary embodiment of the present disclosure, a mobile station apparatus in a wireless communication system supporting FQAM is provided. The apparatus includes a processor for measuring channel quality information, for measuring non-Gaussian information for a data region, and transceiver for transmitting the channel quality information and the non-Gaussian information to a base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
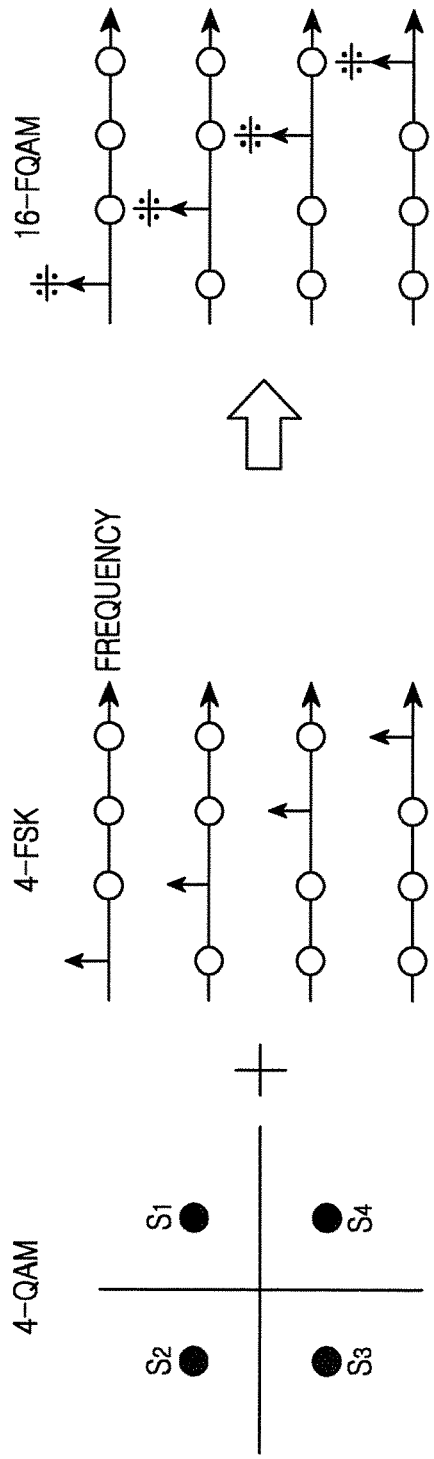
FIGS. 1A to 1C illustrate the concept of a quadrature-amplitude modulation (FQAM) scheme according to the present disclosure.

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Frequency Quadrature Amplitude Modulation scheme. Hereinafter, various exemplary embodiments of the present disclosure are described with reference to the accompanying drawings. While the various exemplary embodiments of the present disclosure are susceptible to various modifications and alternative forms, a specific embodiment thereof has been shown by way of example in the drawings and will herein be described in detail. It should be understood, however, that it is not intended to limit the various exemplary embodiments of the present disclosure to the particular form disclosed, but, on the contrary, the various exemplary embodiments of the present disclosure are to cover all modifications and/or equivalents and alternatives falling within the spirit and scope of the various exemplary embodiments of the present disclosure as defined by the appended claims. Like reference numerals denote like constitutional elements throughout the drawings.

The expression "include" or "may include" used in the various exemplary embodiments of the present disclosure is intended to indicate a presence of a corresponding function, operation, or constitutional element disclosed herein, and it is not intended to limit a presence of one or more functions, operations, or components. In addition, in the various exemplary embodiments of the present disclosure, the term "include" or "have" is intended to indicate that characteristics, numbers, steps, operations, constitutional elements, and components disclosed in the specification or combinations thereof exist, and thus should be understood that there are additional possibilities of one or more other characteristics, numbers, steps, operations, constitutional elements, components or combinations thereof.

In various exemplary embodiments of the present disclosure, an expression "A or B", "at least one of A and/or B" or the like may include some or all possible combinations of items enumerated together. For example, "A or B" or "at least one of A and/or B" may include a case where A is included, a case where B is included, or a case where both A and B are included.

Although expressions used in various exemplary embodiments of the present disclosure such as "$1^{st}$", "$2^{nd}$", "first", "second" may be used to express various constitutional elements of the various exemplary embodiments, it is not intended to limit the corresponding constitutional elements. For example, the above expressions are not intended to limit an order and/or an importance of the corresponding constitutional elements. The above expressions may be used to distinguish one constitutional element from another constitutional element. For example, a $1^{st}$ user device and the $2^{nd}$ user device are both user devices, and indicate different user devices. For example, a $1^{st}$ constitutional element may be termed a $2^{nd}$ constitutional element, and similarly, the $2^{nd}$ constitutional element may be termed the $1^{st}$ constitutional element without departing from the scope of the various exemplary embodiments of the present disclosure.

When a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (such as an embedded processor) for performing a corresponding operation or a generic-purpose processor (such as central processing unit (CPU) or an application processor) capable of performing corresponding operations by executing one or more software programs stored in a memory device.

The terminology used in various exemplary embodiments of the present disclosure is for the purpose of describing particular exemplary embodiments only and is not intended to be limiting of the various exemplary embodiments of the present disclosure. A singular expression includes a plural expression unless there is a contextually distinctive difference therebetween.

Unless otherwise defined, all terms (including technical and scientific terms) used herein have the same meaning as commonly understood by those ordinarily skilled in the art to which various exemplary embodiments of the present disclosure belong. It will be further understood that terms, such as those defined in commonly used dictionaries, should be interpreted as having a meaning that is consistent with their meaning in the context of the relevant art and the various exemplary embodiments of the present disclosure, and will not be interpreted in an idealized or overly formal sense unless expressly so defined herein.

In addition, although a wireless communication network is described in the specification, an operation achieved in the wireless communication network may be achieved in a process of controlling a network and transmitting data in a system (such as a base station) which manages the wireless communication system, or the operation may be achieved in a mobile station coupled to the wireless network.

A wireless communication system according to an exemplary embodiment of the present disclosure includes a plurality of base stations (BSs). Each BS provides a communication service to a specific geographical region (generally called a cell). The cell may be divided into a plurality of regions (or sectors).

A mobile station (MS) may be fixed or mobile, and may also be called other terms such as a user equipment (UE), a mobile terminal (MT), a user terminal (UT), a subscriber station (SS), a wireless device, a personal digital assistant (PDA), a wireless modem, a handheld device, and the like.

The BS is generally a fixed station which communicates with the MS, and may also be called other terms such as an evolved-NodeB (eNB), a base transceiver system (BTS), an access point, and the like. The cell should be interpreted in a comprehensive meaning for indicating a part of an area covered by the BS, and includes all various coverage areas such as a mega cell, a macro cell, a micro cell, a pico cell, a femto cell, and the like.

The embodiments described hereinafter relate to a method and apparatus for feeding back non-Gaussian information and channel quality information in a wireless communication system using a frequency and quadrature-amplitude modulation (FQAM) scheme.

FIGS. 1A to 1C illustrate the concept of an FQAM scheme according to the present disclosure. The FQAM scheme of FIGS. 1A to 1C are a scheme in which 4-quadrature amplitude modulation (QAM) and 4-frequency shift keying (FSK) are combined.

Referring to FIGS. 1A to 1C, 4-QAM of FIG. 1A has four constellation points in an orthogonal coordinate, and thus can generate four complex symbols each having a different phase. 4-FSK of FIG. 1B uses four frequency values, and thus can generate four complex symbols each having a different frequency. The FQAM of FIG. 1C is a combination of the 4-QAM and the 4-FSK. As illustrated in FIG. 1C, since FQAM symbols can have four different frequency values and can simultaneously have four phase values, 16 symbols can be generated in total.

As such, by using the frequency to which a QAM symbol will be mapped, the FQAM extends the number of bit-streams that can be expressed only with the QAM by the number of frequencies. In other words, by using a phase and size of an FSK symbol, the FQAM extends the number of bit-streams that can be expressed only with the FSK by the number of QAM symbols. That is, the FQAM symbol is identified with a combination of a phase and size of the symbols and a location on a frequency to which the symbol is mapped.

When the FQAM is used, an MS feeds back additionally required channel quality information to a BS. That is, the MS transmits to the BS a metric (e.g., $\alpha$, $\beta$, kurtosis, etc.) capable of measuring non-Gaussian information of a channel by adding the metric to a signal to interference plus noise ratio (SINR).

When the MS measures the non-Gaussian information of the channel by using only a small number of pilots, a non-Gaussianization level is not properly represented. Therefore, there is a need to measure the non-Gaussian information in a data region of a channel which experiences an actual interference. For this, the data region for determining the non-Gaussian information must be preferentially allocated.

The MS receives a reference signal (e.g., a pilot) in a typical manner during a feedback period in which data is not received, and measures reception quality of the reference signal and feeds back channel quality information (e.g., SINR) by assuming a state (e.g., $\alpha=2$) in which non-Gaussianization is not present.

The MS measures non-Gaussianization of a determined region in a whole region of received data during the feedback period in which the data is received, and feeds back it together with the channel quality information.

In other words, if the MS measures the non-Gaussianization of the channel by using only the small number of pilot signals, its accuracy is significantly low and thus performance deterioration is expected. Therefore, a measurement in the data region is required to measure the non-Gaussianization of the channel. That is, a data region which may have a certain level of accuracy must be defined to measure the non-Gaussianization of the channel.

Information on such a data region must be directly or indirectly reported by the BS to the MS. In general, channel quality information is fed back periodically in a downlink. Therefore, if the information on the data region defined by including an initial operation situation is not present, the MS measures an existing reference signal (e.g., a pilot) by assuming a state (i.e., $\alpha=2$) in which non-Gaussianization is not present, and then feeds back channel quality information (e.g., SINR).

In this case, the BS can recognize that there is a need to use the FQAM. In doing so, the BS can allocate a specific data region, measure non-Gaussianization for the region, and feedback it to the MS. If the MS can perform such an operation within a periodic feedback period, the non-Gaussianization is measured with respect to corresponding data and is fed back to the BS.

Meanwhile, in order for a non-Gaussianization level in the data region to be meaningful, a measurement time and an actual reception time must have a similar state. In order to have such a similarity, each BS needs to be configured such that the same data region continuously uses the FQAM. In addition, an accuracy for the non-Gaussianization level can be guaranteed only when an FSK modulation order (i.e., $M_F$) is identical.

The BS can determine a modulation coding scheme (MCS) level of the MS by considering both the channel quality information and information obtained by measuring the non-Gaussianization. An example of the MCS table is shown in Table 1 below.

TABLE 1

| MCS index | SINR | non-Gaussian information($\alpha$) | modulation | Code rate |
|---|---|---|---|---|
| 1 | [−10, −9] | 0 | 16-FQAM(4, 4) | 1/3 |
| 2 | • | 1 | 16-FQAM(8, 2) | 1/3 |
| 3 | • | 2 | 32-FQAM(8, 4) | 1/3 |
| • | • | | | |
| X | [a, b] | 0 | | |
| • | • | 1 | 64QAM | 2/4 |
| • | • | 2 | 64QAM | 1/2 |
| N | [19, 20] | | 16M | 3/4 |

A procedure of obtaining the values $\alpha$ and $\beta$ in a metric (e.g., $\alpha$, $\beta$, kurtosis, etc.) capable of measuring non-Gaussian information can be described as follows in the present disclosure.

$$Y_l[k] = H_{1,l}[k]s_1[k]\delta_{l,m_a[k]} + J_l[k] \text{ where} \quad \text{(Equation 1)}$$

$$J_l[k] \triangleq \left\{ \sum_{a=2}^{N_{BS}} \sqrt{I_a} H_a[k]s_a[k]\delta_{l,m_a[k]} \right\} + \mu_l[k]$$

$M_F$: FSK modulation order $$f_{Y[k]}(y[k] \mid \hat{H}_1[k], m_1[k], s_1[k]) =$$

$$\prod_{l=0}^{M_F-1} f_{Y_l[k]}(y_l[k] \mid \hat{H}_{1,l}[k], m_1[k], s_1[k]) \text{ where}$$

$$f_{Y_l[k]}(y_l[k] \mid \hat{H}_{1,l}[k], m_1[k], s_1[k]) =$$

$$\frac{\alpha}{2\pi\beta^2 \Gamma(2/\alpha)} \exp\left(-\left(\frac{|y[k] - \hat{H}_{1,l}[k]s_l[k]\delta_{l,m_a[k]}|}{\beta}\right)^\alpha\right) \text{ and}$$

-continued $$\begin{cases} \alpha = \dfrac{\ln(3^6/2^{10})}{\ln\left(\dfrac{(E[|\hat{J}_l[k]|])^2 / E[|\hat{J}_l[k]|^2] -}{\dfrac{\pi}{4} + \dfrac{9}{2^{3.5}}}\right) + \ln\left(\dfrac{3}{2\sqrt{2}}\right)} \\ \beta = \dfrac{\Gamma(2/\alpha)}{\Gamma(3/\alpha)} E[|\hat{J}_l[k]|] \\ \hat{J}_l[k] = y_l[k] - \hat{H}_{1,l}[k]\hat{s}_l[k]\delta_{l,\hat{m}_l[k]} \end{cases}$$

$\hat{s}_l[k], \hat{m}_l[k]$: hard decision result of Rx signal $f_{Y[k]}(\ )$ denotes a probability density function of a $k^{th}$ transmit (Tx) symbol, $y[k]$ denotes a receive (Rx) signal corresponding to the $k^{th}$ Tx symbol, $m[k]$ denotes a number assigned to a tone on which a QAM symbol is carried in a $k^{th}$ FQAM block, $s[k]$ denotes a QAM symbol of the $k^{th}$ Tx symbol, $y_l[k]$ denotes an Rx signal corresponding to the $k^{th}$ Tx symbol in an $l^{th}$ tone, $f_{y_l[k]}$ denotes a probability density function of the $k^{th}$ Tx symbol in the $l^{th}$ tone, $\hat{H}_l[k]$ denotes an estimation value of a channel coefficient for the $k^{th}$ Tx symbol in the $l^{th}$ tone, $\alpha$ denotes a shape parameter, $\beta$ denotes a scale parameter, $\Gamma$ denotes a gamma function defined as $\Gamma(z) \triangleq \int_0^\infty t^{z-1}\exp(-t)dt$, and $\delta_{l,m[k]}$ denotes a delta function which returns 1 if $l$ is equal to $m[k]$, and otherwise 0. $\hat{s}[k]$ denotes the $k^{th}$ Tx symbol estimated in a hard decision manner.

A procedure of obtaining the values $\alpha$ and $\beta$ by using the above equation can be described as follows. A complex generalized Gaussian (CGG) decoding scheme is a representative scheme among the conventional non-Gaussian decoding schemes. It is assumed in the CGG decoding scheme that an interference signal or noise conforms to a CGG distribution. Since the CGG decoding scheme includes the Gaussian decoding scheme, the present disclosure describes the CGG decoding scheme. A probability density function of the CGG distribution is expressed by Equation 2 below.

$$f_{\tilde{z}}(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right) \quad \text{(Equation 2)}$$

In Equation 2 above, $f_{\tilde{z}}$ denotes a probability density function of a noise, $z$ denotes a variable indicating the noise, $\alpha$ denotes a non-Gaussian level as a shape parameter, $\beta$ denotes a variance as a scale parameter, and $\Gamma$ denotes a gamma function defined as $\Gamma(z) \triangleq \int_0^\infty t^{z-1}\exp(-t)dt$.

In Equation 2 above, the probability density function of the CGG distribution conforms to a Gaussian distribution if $\alpha$ is 2, conforms to a super Gaussian distribution having a heavy-tail if $\alpha$ is less than 2, and conforms to a sub Gaussian distribution having a light-tail if $\alpha$ is greater than 2. That is, if $\alpha$ is 2, the CGG decoding scheme is the same as the Gaussian decoding scheme.

In case of the FQAM, one symbol occupies multi-tones unlike the QAM. Therefore, the present disclosure can calculate a probability density function for a Gaussian or non-Gaussian symbol for the FQAM as expressed by Equation 3 below.

$$f_{Y[k]}(y[k] \mid \hat{H}_1[k], m_1[k], s_1[k]) = \quad \text{(Equation 3)}$$

-continued $$\prod_{l=0}^{M_F=1} f_{Y_l[k]}(y_l[k] | \hat{H}_{1,l}[k], m_1[k], s_1[k])$$

In Equation 3 above, $f_{Y[k]}()$ denotes a probability density function of a $k^{th}$ Tx symbol, y[k] denotes an Rx signal corresponding to the $k^{th}$ Tx symbol, H[k] denotes an estimation value of a channel coefficient for the $k^{th}$ Tx symbol, m[k] denotes a number assigned to a tone on which a QAM symbol is carried in a $k^{th}$ FQAM block, s[k] denotes a QAM symbol of the $k^{th}$ Tx symbol, $f_{Y[k]}$ denotes a probability density function of the $k^{th}$ Tx symbol, $y_l[k]$ denotes an Rx signal corresponding to the $k^{th}$ Tx symbol in an $l^{th}$ tone, and $\hat{H}_l[k]$ denotes an estimation value of a channel coefficient for the $k^{th}$ Tx symbol in the $l^{th}$ tone. This can be expressed again as Equation 4 below.

$$f_{Y_l[k]}(y_l[k] | \hat{H}_l[k], m[k], s[k]) = \frac{\alpha}{2\pi\beta^2\Gamma(2/\alpha)} \exp\left(-\left(\frac{|y[k] - \hat{H}_l[k]s[k]\delta_{l,m[k]}|}{\beta}\right)^\alpha\right)$$ (Equation 4)

In Equation 4 above, $f_{Y_i}^{[k]}$ denotes a probability density function of a $k^{th}$ Tx symbol in an $l^{th}$ tone, $y_l[k]$ denotes an Rx signal corresponding to the $k^{th}$ Tx symbol in the $l^{th}$ tone, $\hat{H}_l[k]$ denotes an estimation value of a channel coefficient for the $k^{th}$ Tx symbol in the $l^{th}$ tone, m[k] denotes a number assigned to a tone on which a QAM symbol is carried in a $k^{th}$ FQAM block, s[k] denotes a QAM symbol of the $k^{th}$ Tx symbol, $\alpha$ denotes a shape parameter, $\beta$ denotes a scale parameter, $\Gamma$ denotes a gamma function defined as $\Gamma(z) \triangleq \int_0^\infty t^{z-1}\exp(-t)dt$, and $\delta_{l,m[k]}$ denotes a delta function which returns 1 if l is equal to m[k], and otherwise 0.

Most non-Gaussian decoding schemes include a multiplier calculation of the shape parameter a. Since a is an integer value greater than 0, in general, a complexity for calculating the multiplier a is significantly great. Since actual interference signals or noises conform to a super Gaussian distribution having a heavy-tail in most cases, the shape parameter a of the non-Gaussian distribution (e.g., CGG, generalized gaussian (GG), symmetric alpha stable (SaS)) has a value in the range of 0 to 2.

Regarding most interference signals and noises, modeling is achieved with a super Gaussian distribution of which the value $\alpha$ is in the range of 0 to 2 or is achieved with a Gaussian distribution. The value $\beta$ called a scale parameter performs the same role as a variance of a Gaussian probability density function.

Probability density functions used in most non-Gaussian decoding schemes include a shape parameter and a scale parameter, for example, $\alpha$ and $\beta$ of the CGG distribution. Therefore, although the CGG is described for example in the present disclosure, it is apparent that the present disclosure is also applicable to most existing non-Gaussian decoding schemes.

There are various methods of estimating the values $\alpha$ and $\beta$. Hereinafter, the present disclosure utilizes a known moment matching scheme. According to the moment matching scheme, the values $\alpha$ and $\beta$ are estimated by matching a primary moment and a secondary moment. The values $\alpha$ and $\beta$ are expressed by Equation 5 below.

$$\alpha = \frac{\ln(3^6/2^{10})}{\ln\left(\frac{(E[|\hat{J}_l[k]|])^2/E[|\hat{J}_l[k]|^2] - \frac{\pi}{4} + \frac{9}{2^{3.5}}}{\frac{\pi}{4} + \frac{9}{2^{3.5}}}\right) + \ln\left(\frac{3}{2\sqrt{2}}\right)}$$ (Equation 5)

$$\hat{J}_l[k] = y_l[k] - \hat{H}_{1,l}[k]\hat{s}_l[k]\delta_{l,\hat{m}_l[k]}$$

$$\beta = \frac{\Gamma(2/\alpha)}{\Gamma(3/\alpha)}E[|\hat{J}_l[k]|]$$

In Equation 5 above, $\alpha$ denotes a shape parameter, $\beta$ denotes a scale parameter, y[k] denotes an Rx signal corresponding to a $k^{th}$ Tx symbol, $\hat{H}[k]$ denotes an estimation value of a channel coefficient for the $k^{th}$ Tx symbol, $\hat{s}[k]$ denotes the $k^{th}$ Tx symbol estimated in a hard decision manner, and $\Gamma$ denotes a gamma function defined as $\Gamma(z) \triangleq \int_0^\infty t^{z-1}\exp(-t)dt$.

A first exemplary embodiment to be described hereinafter assumes a state where an FQAM scheme is used between a BS and an MS, a data region for measuring non-Gaussian information by the MS is predetermined, and the BS and the MS known in advance of the data region for measuring the non-Gaussian information.

Figure 2:
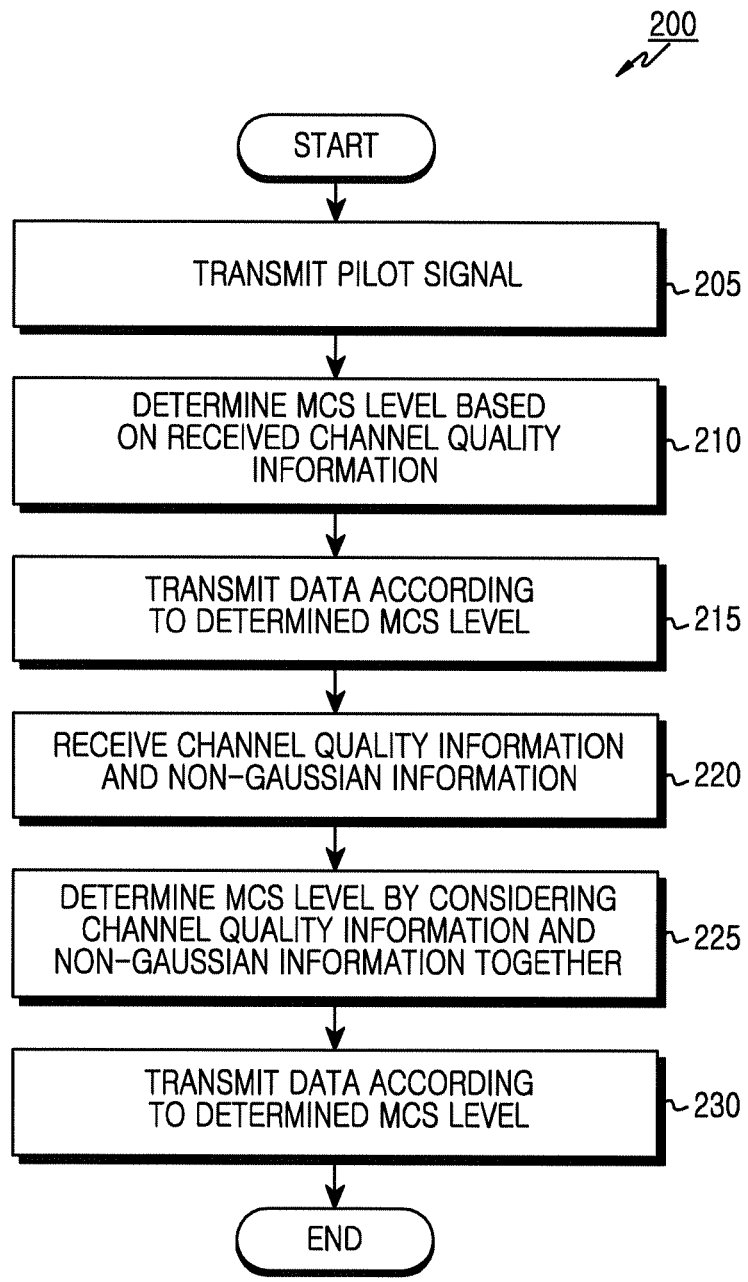
FIG. 2 is a flowchart illustrating a method of operating a base station (BS) according to a first exemplary embodiment of the present disclosure.

FIG. 2 is a flowchart illustrating a method of operating a BS 200 according to a first exemplary embodiment of the present disclosure.

Referring to FIG. 2, the BS 200 transmits a pilot signal to an MS 300 in step 205. The pilot signal is an example of a reference signal transmitted by the BS 200 to the MS 300.

Thereafter, the BS 200 receives channel quality information (e.g., SINR) from the MS 300, and determines an MCS level for the MS 300 on the basis of the channel quality information in step 210.

Thereafter, the BS 200 performs modulation and coding according to the determined MCS level, and transmits data to the MS 300 in step 215.

Thereafter, the BS 200 receives the channel quality information and non-Gaussian information from the MS 300 in step 220. The MCS level for the MS 300 is determined by considering the channel quality information and the non-Gaussian information together in step 225. The BS 200 can determine the MCS level for the MS 300 on the basis of an MCS table disclosed in Table 1 above. That is, the BS 200 can determine the MCS level by additionally considering a non-Gaussianization level of a current channel. In this case, the BS 200 can determine a modulation order, a modulation frequency, a code rate, or the like according to the non-Gaussianization level, and can determine the MCS level corresponding to the determined value.

Thereafter, the BS 200 performs modulation and coding according to the determined MCS level, and transmits data to the MS 300 in step 230.

Figure 3:
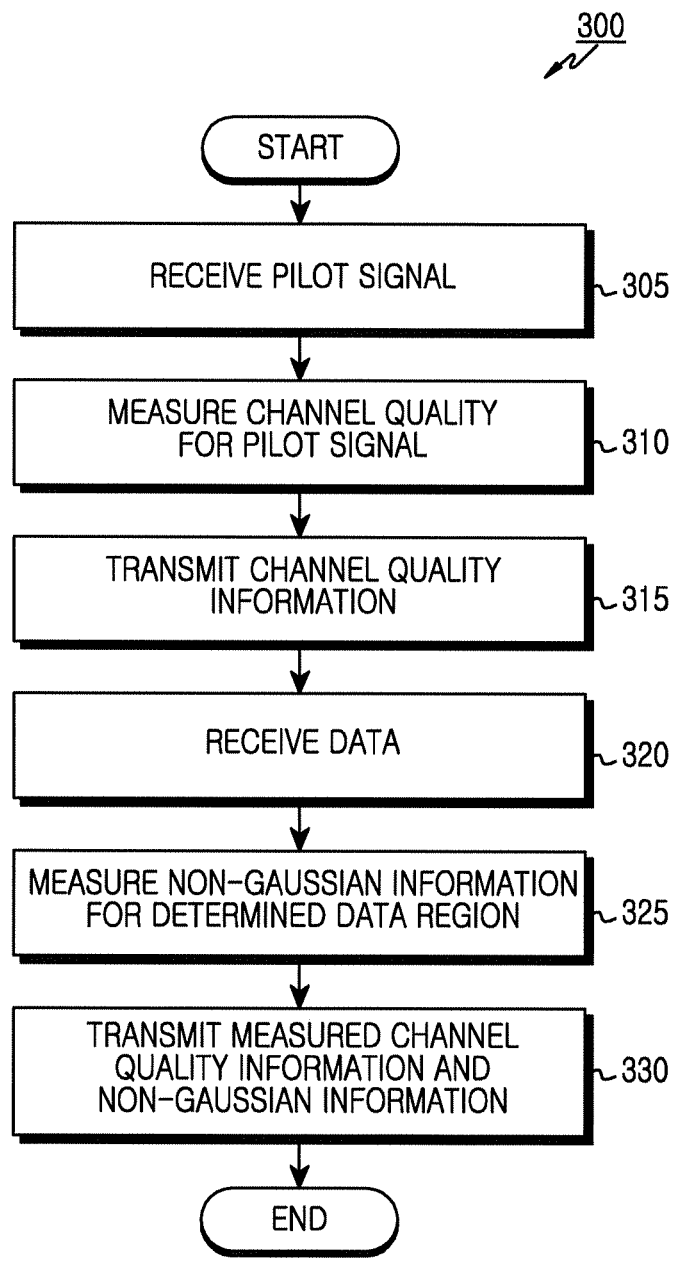
FIG. 3 is a flowchart illustrating a method of operating a mobile station (MS) according to a first exemplary embodiment of the present disclosure.

FIG. 3 is a flowchart illustrating a method of operating an MS 300 according to a first exemplary embodiment of the present disclosure.

Referring to FIG. 3, the MS 300 receives a pilot signal transmitted by a BS 200 in step 305. The pilot signal is an example of a reference signal transmitted by the BS 200 to the MS 300.

Thereafter, the MS 300 measures channel quality for the pilot signal in step 310. The MS 300 transmits information on the measured channel quality (e.g., SINR) to the BS 200 in step 315.

Thereafter, the MS 300 receives data transmitted by the BS 200 in step 320. In step 325, the MS 300 measures non-Gaussian information for a determined data region based on the received data. In the above process, the previous channel quality measurement process can be performed together.

Thereafter, the MS 300 transmits the measured channel quality information and non-Gaussian information to the BS 200 in step 330.

Figure 4:
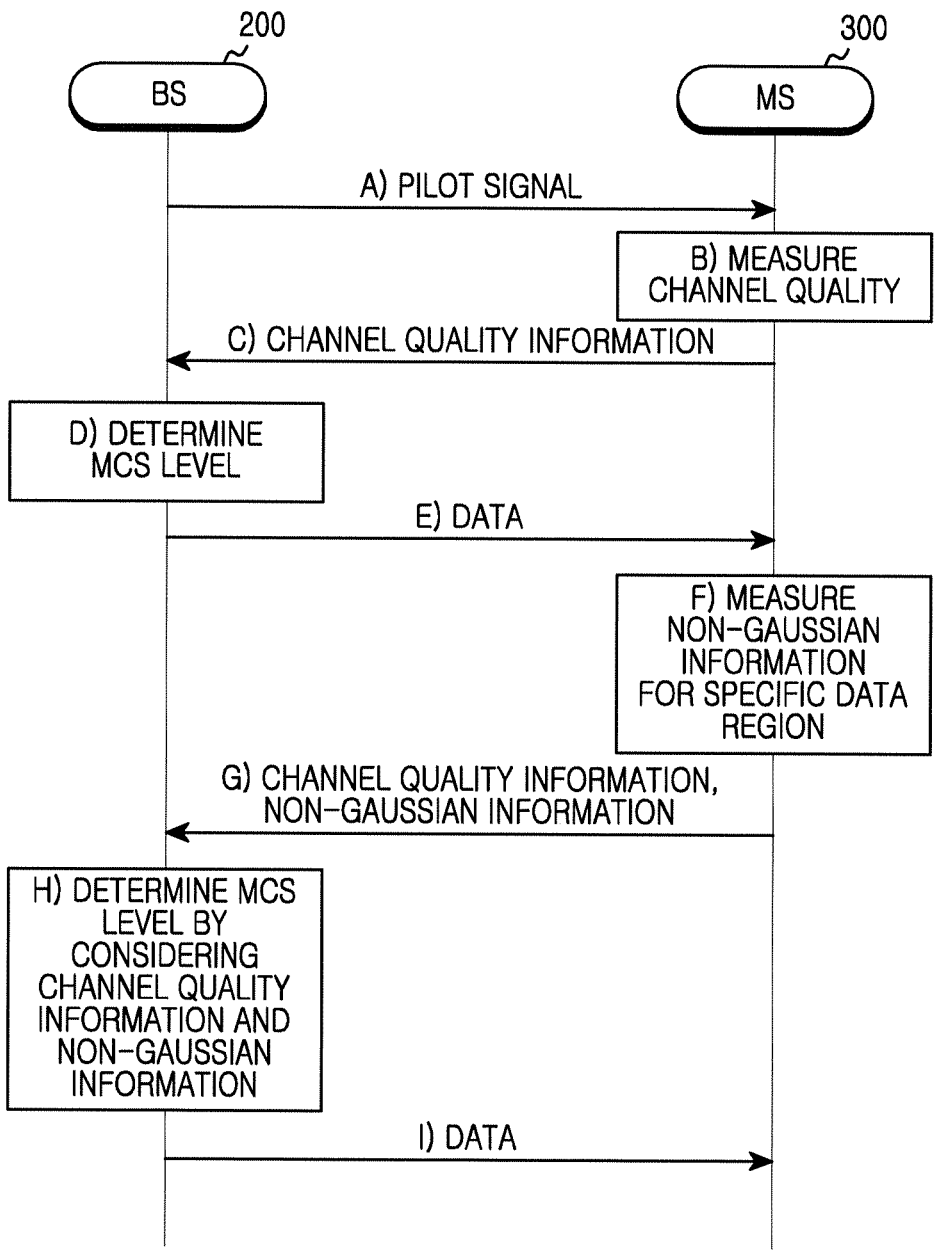
FIG. 4 illustrates a message flow between a BS and an MS according to a first exemplary embodiment of the present disclosure.

FIG. 4 illustrates a message flow between a BS and an MS according to a first exemplary embodiment of the present disclosure.

Referring to FIG. 4, a BS 200 transmits a pilot signal to an MS 300 in step A. The pilot signal is an example of a reference signal transmitted by the BS 200 to the MS 300. The MS 300 receives the pilot signal transmitted by the BS 200, measures channel quality for the pilot signal in step B, and thereafter transmits channel quality information (e.g., SINR) to the BS in step C.

Thereafter, the BS 200 receives the channel quality information (e.g., SINR) from the MS 300, and determines an MCS level on the basis of the channel quality information in step D.

Thereafter, the BS 200 performs modulation and coding according to the determined MCS level, and transmits data to the MS 300 in step E.

Thereafter, the MS 300 receives data transmitted by the BS 200, and determines non-Gaussian information by measuring non-Gaussianization for a determined data region in step F. In the above process, the previous channel quality measurement process can also be performed together.

Thereafter, the MS 300 transmits to the BS 200 the measured channel quality information and non-Gaussian information together in step G.

Thereafter, the BS 200 receives the non-Gaussian information for a channel from the MS 300, and determines an MCS level for the MS 300 by considering the channel quality information and the non-Gaussian information together in step H. The BS 200 can determine the MCS level for the MS on the basis of an MCS table disclosed in Table 1 above.

Thereafter, the BS 200 performs modulation and coding according to the determined MCS level, and transmits data to the MS 300 in step I.

A second exemplary embodiment to be described hereinafter assumes a case where a BS determines whether to use an FQAM scheme on the basis of channel quality information transmitted by an MS and instructs the MS to measure non-Gaussian information.

Figure 5:
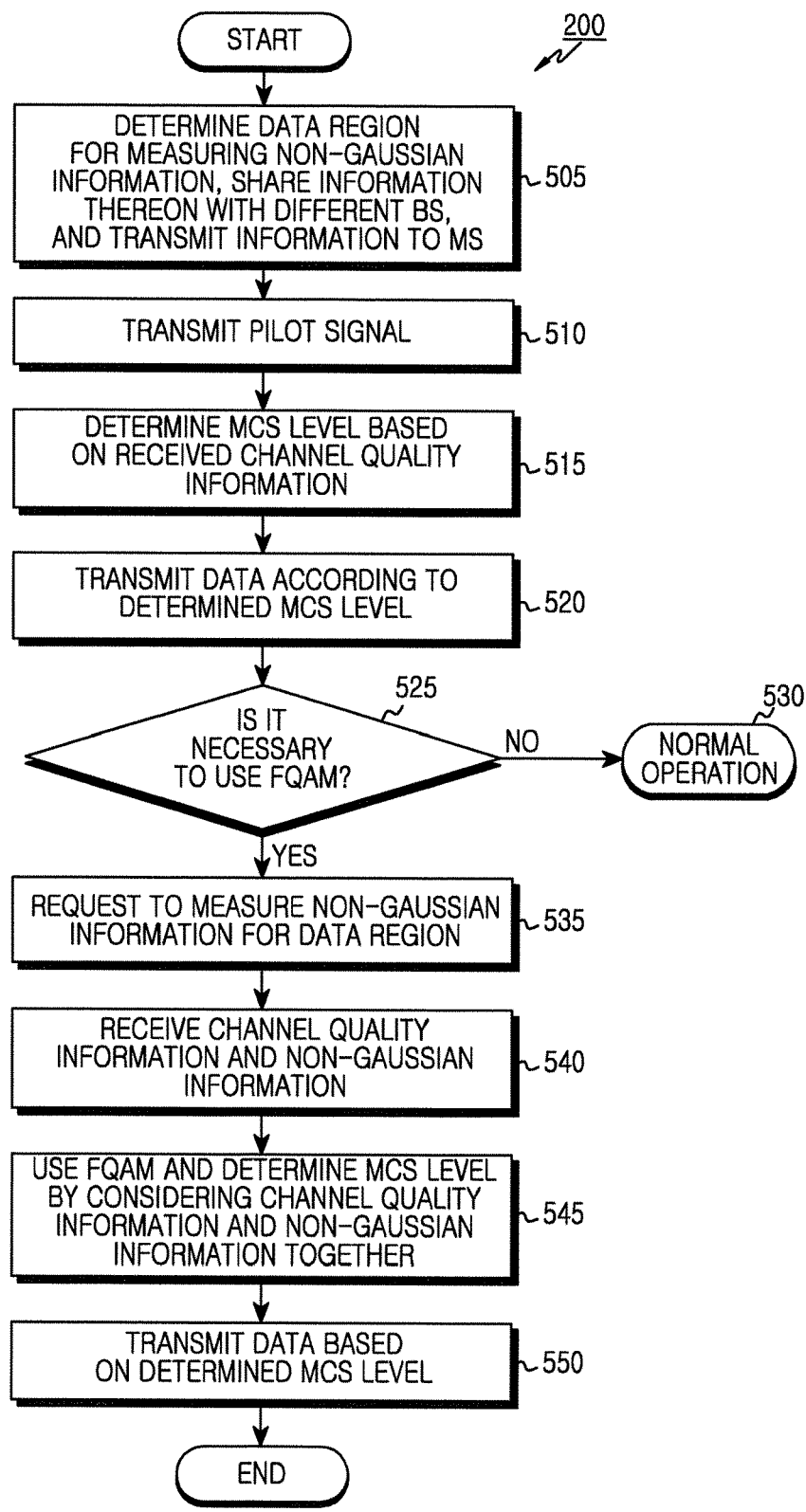
FIG. 5 is a flowchart illustrating a method of operating a BS according to a second exemplary embodiment of the present disclosure.

FIG. 5 is a flowchart illustrating a method of operating a BS according to a second exemplary embodiment of the present disclosure.

Referring to FIG. 5, the BS 200 determines a data region in which an MS measures non-Gaussian information, shares information thereon with a different BS, and transmits the information to the MS 300 in step 505.

In the present disclosure, any BS can determine the data region for measuring the non-Gaussian information. In addition, the BS can determine any data region, or determine a data region which applies a non-Gaussianization level in a most appropriate manner by using a statistical value and a measurement value. In addition, it is apparent that there is no restriction on a method in which the BS determines the data region for measuring the non-Gaussian information.

Thereafter, the BS 200 transmits a pilot signal to the MS 300 in step 510. The pilot signal is an example of a reference signal transmitted by the BS to the MS.

Thereafter, the BS 200 receives channel quality information (e.g., SINR) from the MS 300, and determines an MCS level for the MS on the basis of the channel quality information in step 515.

Thereafter, the BS 200 performs modulation and coding according to the determined MCS level, and transmits data to the MS 300 in step 520.

If it is necessary to use FQAM in step 525, the BS 200 requests the MS 300 to measure non-Gaussian information for the data region in step 535.

If it is not necessary to use the FQAM in step 525, the BS 200 performs a normal operation in step 530.

If the channel quality information transmitted by the MS 300 is channel quality information used to estimate a pilot signal, the BS 200 can determine that it is necessary to use the FQAM. Alternatively, if the channel quality information transmitted by the MS 300 is less than a specific threshold, the BS 200 can determine to use the FQAM.

Thereafter, the BS 200 receives the channel quality information and the non-Gaussian information from the MS 300 in step 540.

Thereafter, the BS 200 uses an FQAM scheme, and determines an MCS level by considering the channel quality information and the non-Gaussian information together in step 545. The BS 200 can determine the MCS level for the MS 300 on the basis of an MCS table disclosed in Table 1 above.

Thereafter, the BS 200 performs modulation and coding on data according to the determined MCS level and transmits it to the MS 300 in step 550.

Figure 6:
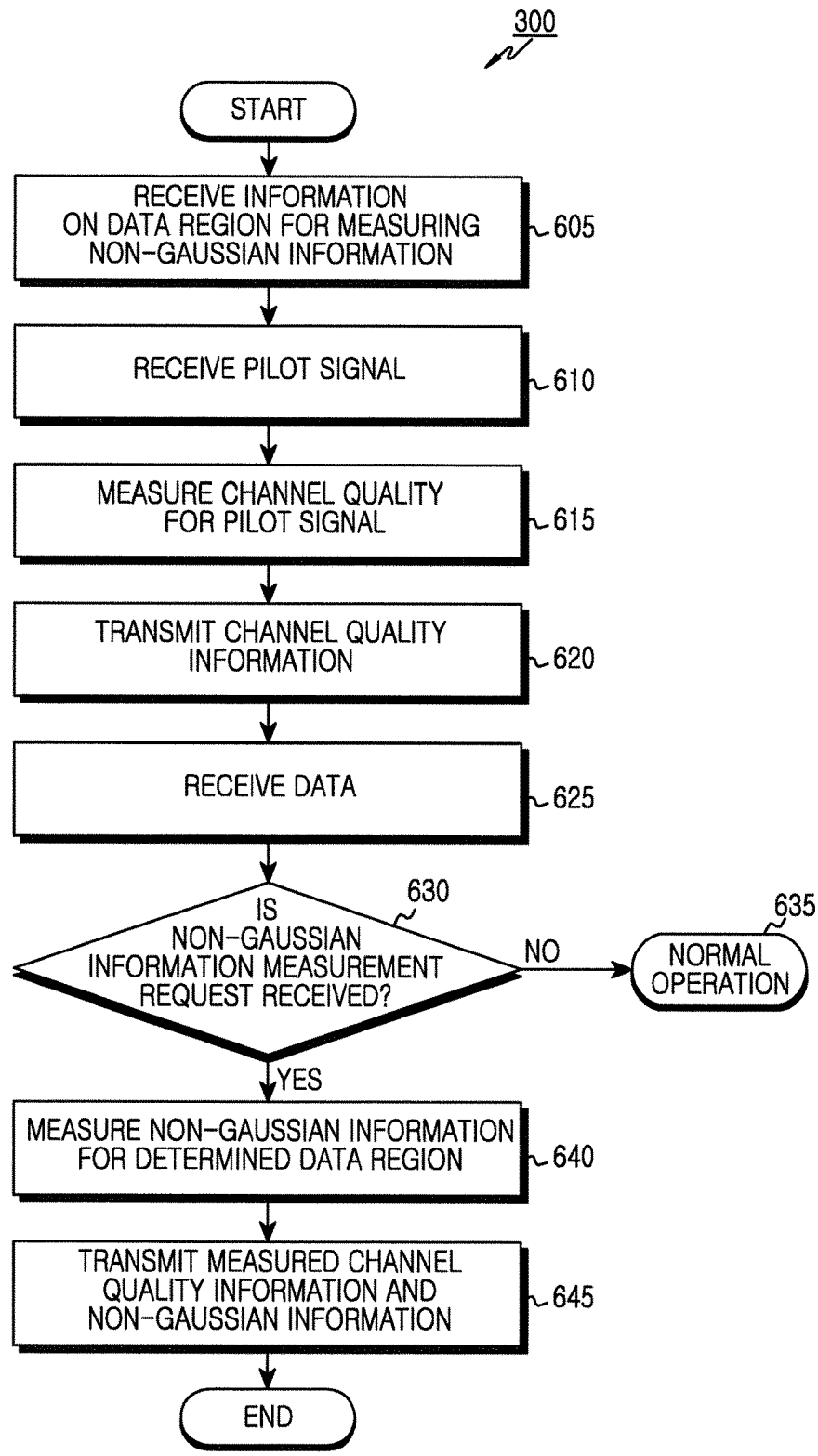
FIG. 6 is a flowchart illustrating a method of operating an MS according to a second exemplary embodiment of the present disclosure.

FIG. 6 is a flowchart illustrating a method of operating an MS 300 according to a second exemplary embodiment of the present disclosure.

Referring to FIG. 6, the MS 300 receives information on a data region for measuring non-Gaussian information in step 605. The information on the data region indicates the data region in which the MS measures a non-Gaussianization level.

Thereafter, the MS 300 receives a pilot signal transmitted by a BS 200 in step 610. The pilot signal is an example of a reference signal transmitted by the BS 200 to the MS 300.

Thereafter, the MS 300 measures channel quality for the pilot signal in step 615. The MS transmits channel quality information (e.g., SINR) to the BS in step 620.

Thereafter, the MS receives data transmitted by the BS in step 625.

If the MS 300 receives a request for measuring non-Gaussian information from the BS in step 630, the MS 300 measures the non-Gaussian information for the determined data region in step 640.

If the MS 300 does not receive the request for measuring the non-Gaussian information from the BS in step 630, the MS 300 performs a normal operation in step 635.

Thereafter, the MS 300 transmits the measured channel quality information and non-Gaussian information to the BS in step 645.

Figure 7:
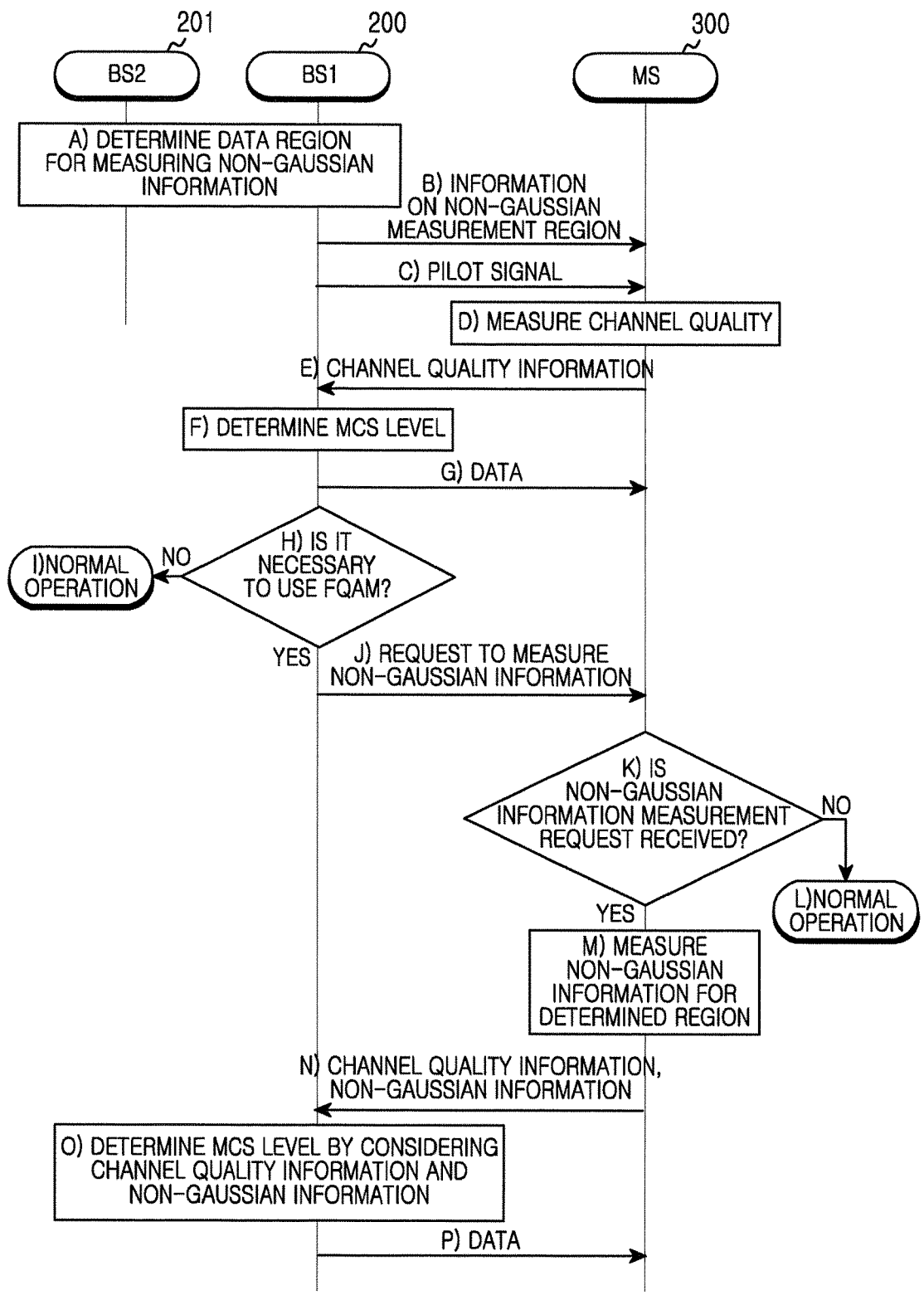
FIG. 7 illustrates a message flow between a BS and an MS according to a first exemplary embodiment of the present disclosure.

FIG. 7 illustrates a message flow between a BS and an MS according to a first exemplary embodiment of the present disclosure.

Referring to FIG. 7, a BS1 200 determines a data region for measuring non-Gaussian information, and shares it with a BS2 201 in step A. Alternatively, the BS2 201 can determine the data region for measuring the non-Gaussian information, and can share it with the BS1 200.

In the present disclosure, any BS can determine the data region for measuring the non-Gaussian information. In addition, the BS can determine any data region, or determine a data region which applies a non-Gaussianization level in a most appropriate manner by using a statistical value and a measurement value. In addition, it is apparent that there is no restriction on a method in which the BS determines the data region for measuring the non-Gaussian information.

Thereafter, the BS1 200 transmits information on the data region for measuring the determined non-Gaussian information to the MS 300 in step B. The MS 300 receives the information on the data region for measuring the non-Gaussian information.

Thereafter, the BS1 200 transmits a pilot signal to the MS 300 in step C, and the MS 300 receives the pilot signal transmitted by the BS1 200. The pilot signal is an example of a reference signal transmitted by the BS1 200 to the MS 300.

Thereafter, the MS 300 measures channel quality for the pilot signal in step D, and transmits generated channel quality information (e.g., SINR) to the BS1 200 in step E.

Thereafter, the BS1 200 receives the channel quality information (e.g., SINR) from the MS 300, and determines an MCS level on the basis of the channel quality information in step F.

Thereafter, the BS1 200 performs modulation and coding according to the determined MCS level and transmits data to the MS 300 in step G. The MS 300 receives the data transmitted by the BS1 200.

If it is necessary to use FQAM in step H, the BS1 200 requests the MS 300 to measure non-Gaussian information for the data region in step J.

If it is not necessary to use the FQAM in step H, the BS1 200 performs a normal operation in step I.

If the channel quality information transmitted by the MS is channel quality information used to estimate a pilot signal, the BS1 200 can determine that it is necessary to use the FQAM. Alternatively, if the channel quality information transmitted by the MS is less than a specific threshold, the BS1 200 can determine to use the FQAM.

If the MS 300 receives a request for measuring non-Gaussian information from the BS1 200 in step K, the MS 300 measures the non-Gaussian information for the determined data region in step M.

If the MS 300 does not receive the request for measuring the non-Gaussian information from the BS1 200 in step K, the MS 300 performs a normal operation in step L.

The MS transmits the measured channel quality information and non-Gaussian information to the BS1 200 in step N. The BS1 200 receives the channel quality information and the non-Gaussian information from the MS 300.

Thereafter, the BS1 200 uses an FQAM scheme, and determines an MCS level by considering the channel quality information and the non-Gaussian information together in step O. The BS1 200 can determine the MCS level on the basis of an MCS table disclosed in Table 1 above.

Thereafter, the BS1 200 performs modulation and coding on data according to the determined MCS level and transmits it to the MS 300 in step P.

Figure 8:
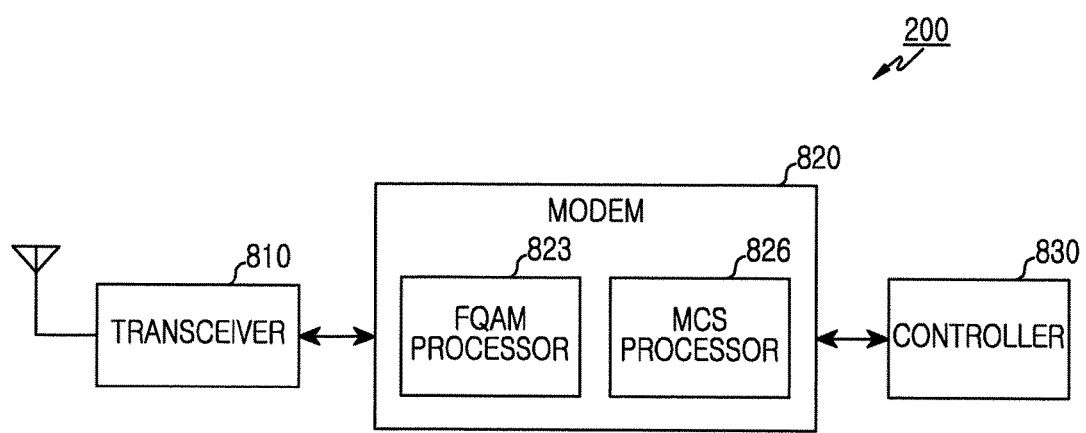
FIG. 8 is a block diagram of a BS according to an exemplary embodiment of the present disclosure.

FIG. 8 is a block diagram of a BS 200 according to an exemplary embodiment of the present disclosure.

Referring to FIG. 8, the BS 200 includes a radio frequency (RF) processor 810, a modem 820, and a controller 830.

The transceiver 810 performs a function for transmitting and receiving a signal through a wireless channel by performing signal band conversion, amplification, etc. That is, the transceiver 810 up-converts a baseband signal provided from the modem 820 into an RF signal, and then transmits the RF signal through an antenna, and also down-converts an RF signal received through the antenna into a baseband signal. For example, the transceiver 810 can include an amplifier, a mixer, an oscillator, a digital to analog converter (DAC), an analog to digital converter (ADC), etc. Although only one antenna is illustrated in FIG. 8, the BS 200 can have multiple antennas.

The modem 820 performs a conversion function between a baseband signal and a bit-stream according to a physical layer protocol of the system. For example, in case of conforming to an orthogonal frequency division multiplexing (OFDM) scheme, in a data transmission process, the modem 820 generates complex symbols by performing coding and modulation on a transmitted bit-stream, maps the complex symbols to subcarriers, and then configures OFDM symbols by performing an inverse fast fourier transform (IFFT) operation and a cyclic prefix (CP) insertion operation. In addition, in a data reception process, the modem 820 splits the baseband signal provided from the transceiver 810 on an OFDM symbol basis, restores signals mapped to the subcarriers by using a fast fourier transform (FFT) operation, and then restores a received bit-stream by performing demodulation and decoding.

In particular, according to an exemplary embodiment of the present disclosure, the modem 820 includes an FQAM processor 823 for modulating/demodulating and coding/decoding an FQAM symbol. Further, the modem 820 includes an MCS processor 826 for receiving non-Gaussian information and channel quality information transmitted by the MS 300, for recognizing a non-Gaussianization level in a data region, and for determining an MCS level by considering the non-Gaussianization level.

The MCS processor 826 transmits the determined MCS level to the MS 300, and performs modulation and coding on data according to the determined MCS level.

The MCS processor 826 determines the data region used by the MS 300 to determine the non-Gaussian information and transmits it to another BS and the MS, and if pilot-based channel quality information of the MS is received, instructs the MS 300 to measure non-Gaussian information for the data region.

The controller 830 provides an overall control to the BS 200. For example, the controller 830 transmits and receives a signal via the modem 820 and the transceiver 810. In addition, the controller 830 determines a configuration required for modulation/demodulation and coding/decoding of the modem 820. The controller 830 can include at least one processor. According to an exemplary embodiment of the present disclosure, the controller 830 can perform at least one of functions performed by the modem 820. The controller may be called other terms such as a processor, processing unit, and the like.

Figure 9:
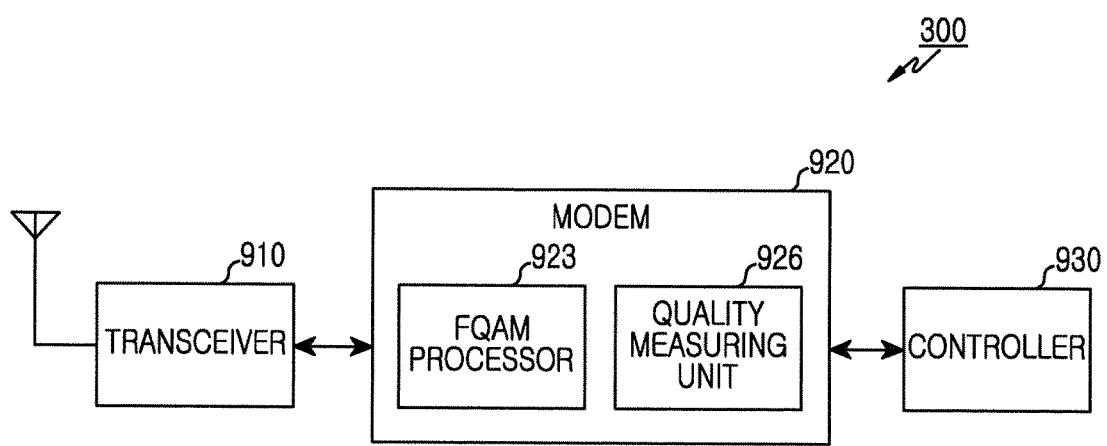
FIG. 9 is a block diagram of an MS according to an exemplary embodiment of the present disclosure.

FIG. 9 is a block diagram of an MS 300 according to an exemplary embodiment of the present disclosure.

Referring to FIG. 9, the MS 300 includes an transceiver 910, a modem 920, and a controller 930.

The transceiver 910 performs a function for transmitting and receiving a signal through a wireless channel by performing signal band conversion, amplification, etc. That is, the transceiver 910 up-converts a baseband signal provided from the modem 920 into an RF signal, and then transmits the RF signal through an antenna, and also down-converts an RF signal received through the antenna into a baseband signal. For example, the transceiver 910 can include an amplifier, a mixer, an oscillator, a digital to analog converter (DAC), an analog to digital converter (ADC), etc. Although only one antenna is illustrated in FIG. 9, the MS can have multiple antennas.

The modem 920 performs a conversion function between a baseband signal and a bit-stream according to a physical layer protocol of the system. For example, in case of conforming to an OFDM scheme, in a data transmission process, the modem 920 generates complex symbols by performing coding and modulation on a transmitted bit-stream, maps the complex symbols to subcarriers, and then configures OFDM symbols by performing an IFFT operation and a CP insertion operation. In addition, in a data reception process, the modem 920 splits the baseband signal provided from the transceiver 910 on an OFDM symbol basis, restores signals mapped to the subcarriers by using a FFT operation, and then restores a received bit-stream by performing demodulation and decoding.

In particular, according to an exemplary embodiment of the present disclosure, the modem 920 includes an FQAM processor 923 for modulating/demodulating and coding/decoding an FQAM symbol. Further, the modem 920 includes a quality measuring unit 926 for receiving information for a data region for determining non-Gaussian information transmitted by a BS 200, for determining the non-Gaussian information for the data region, and for transmitting the determined information to the BS 200.

The controller 930 provides an overall control to the MS. For example, the controller 930 transmits and receives a signal via the modem 920 and the transceiver 910. Further, the controller 930 determines a configuration required for modulation/demodulation and coding/decoding of the modem 920. The controller 930 can include at least one processor. According to an exemplary embodiment of the present disclosure, the controller 930 can perform at least one of functions performed by the modem 920. The controller may be called other terms such as a processor, processing unit, and the like.

According to the present disclosure, a performance of a wireless communication system using a frequency and quadrature-amplitude modulation (FQAM) scheme can be improved by feeding back channel quality information and non-Gaussian information in the wireless communication system.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device can have an access to a device for performing an exemplary embodiment of the present disclosure via an external port. In addition, an additional storage device on a communication network can have an access to the device for performing the exemplary embodiment of the present disclosure.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method of operating a base station in a wireless communication system, the method comprising:
   receiving, from a terminal, channel quality information;
   determining whether to use a frequency and quadrature-amplitude modulation (FQAM) scheme or a quadrature-amplitude modulation (QAM) scheme to modulate a signal based on whether the channel quality information is lower than a threshold or not;
   when the FQAM scheme is determined to be used based on the channel quality information being lower than a threshold:
      transmitting, to the terminal, a message for requesting to measure a non-Gaussianization level for a data region indicated by the base station;
      receiving, from the terminal, information regarding the non-Gaussianization level for the data region;
      determining a first modulation and coding scheme (MCS) level based on the information regarding the non-Gaussianization level for the data region; and
      transmitting, to the terminal, the signal based on the first MCS level,
   when the QAM scheme is determined to be used based on the channel quality information being higher than or same to the threshold:
      determining a signal to interference plus noise ratio (SINR) value based on the channel quality information;
      determining a second MCS level based on the SINK value; and
      transmitting, to the terminal the signal based on the second MCS level.

2. The method of claim 1, further comprising generating the signal by performing modulation and coding according to the determined first MCS level or the determined second MCS level.

3. The method of claim 1, further comprising determining the data region for measuring the non-Gaussianization level for the data region.

4. The method of claim 3, further comprising transmitting information indicating the determined data region to at least one of another base station and the terminal.

5. A method of operating a terminal in a wireless communication system, the method comprising:
   transmitting, to a base station, channel quality information;
   when a frequency and quadrature-amplitude modulation (FQAM) is determined to be used based on the channel quality information being lower than a threshold:
      receiving, from the base station, a message for requesting to measure a non-Gaussianization level for a data region indicated by the base station;

determining the non-Gaussianization level for the data region responsive to the message;

transmitting, to the base station, information regarding the non-Gaussianization level for the data region; and receiving, from the base station, a signal based on a first modulation and coding scheme (MCS) level corresponding to the non-Gaussianization level for the data region, when a quadrature-amplitude modulation (QAM) scheme is determined to be used based on the channel quality information being higher than or same to the threshold, receiving, from the base station, the signal based on a second MCS level corresponding to a signal to interference plus noise ratio (SINR).

6. The method of claim 5, further comprising receiving information indicating the data region for measuring the non-Gaussianization level.

7. A base station apparatus in a wireless communication system, the base station apparatus comprising:
at least one transceiver; and
at least one processor coupled to the at least one transceiver,
wherein the at least one processor is configured to:
receive, from a terminal, channel quality information,
determine whether to use a frequency and quadrature-amplitude modulation (FQAM) scheme or a quadrature-amplitude modulation (QAM) scheme to modulate a signal based on whether the channel quality information is lower than a threshold or not,
when the FQAM scheme is determined to be used based on the channel quality information being lower than a threshold:
transmit, to the terminal, a message for requesting to measure a non-Gaussianization level for a data region indicated by the base station apparatus;
receive, from the terminal, information regarding the non-Gaussianization level for the data region,
determine a first modulation and coding scheme (MCS) level based on the information regarding the non-Gaussianization level for the data region, and
transmit, to the terminal, the signal based on the first MCS level,
when the QAM scheme is determined to be used based on the channel quality information being higher than or same to the threshold:
determine a signal to interference plus noise ratio (SINR) value based on the channel quality information;
determine a second MCS level based on the SINR value; and
transmit, to the terminal the signal based on the second MCS level.

8. The base station apparatus of claim 7, wherein the at least one processor is further configured to generate the signal by performing modulation and coding according to the determined first MCS level or the determined second MCS level.

9. The base station apparatus of claim 7, wherein the at least one processor is further configured to determine the data region for measuring the non-Gaussianization level for the data region.

10. The base station apparatus of claim 9, wherein the at least one processor is further configured to transmit information indicating the determined data region to at least one of another base station and the terminal.

11. A terminal apparatus in a wireless communication system, the terminal apparatus comprising:
at least one transceiver; and
at least one processor coupled to the at least one transceiver,
wherein the at least one processor is configured to:
transmit, to a base station, channel quality information, and
when a frequency and quadrature-amplitude modulation (FQAM) is determined to be used based on the channel quality information being lower than a threshold:
receive, from the base station, a message for requesting to measure a non-Gaussianization level for a data region indicated by the base station,
determine the non-Gaussianization level for the data region responsive to the message,
transmit, to the base station, information regarding the non-Gaussianization level for the data region, and
receive, from the base station, a signal based on a first modulation and coding scheme (MCS) level corresponding to the non-Gaussianization level for the data region,
when a quadrature-amplitude modulation (QAM) scheme is determined to be used based on the channel quality information being higher than or same to the threshold, receive, from the base station, the signal based on a second MCS level corresponding to a signal to interference plus noise ratio (SINR).

12. The terminal apparatus of claim 11, wherein the at least one processor is further configured to receive information indicating the data region for measuring the non-Gaussianization level.

13. The method of claim 1, wherein the first MCS level or the second MCS level is determined based on an MCS table.

14. The base station apparatus of claim 7, wherein the first MCS level or the second MCS level is determined based on an MCS table.

15. The method of claim 5,
wherein the second MCS level is determined based on the SINR, and
wherein the SINR is determined based on the channel quality information.

16. The terminal apparatus of claim 11,
wherein the second MCS level is determined based on the SINR, and
wherein the SINR is determined based on the channel quality information.

* * * * *